US009328473B2

(12) United States Patent
Esnault et al.

(10) Patent No.: US 9,328,473 B2
(45) Date of Patent: May 3, 2016

(54) METHOD FOR CONSOLIDATING SOIL

(71) Applicant: SOLENTANCHE FREYSSINET, Rueil Malmaison (FR)

(72) Inventors: Annette Esnault, Rueil Malmaison (FR); Jean-Francois Mosser, Rueil Malmaison (FR); Serge Borel, Rueil Malmaison (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 50 days.

(21) Appl. No.: 14/372,663

(22) PCT Filed: Jan. 15, 2013

(86) PCT No.: PCT/FR2013/050089
§ 371 (c)(1),
(2) Date: Jul. 16, 2014

(87) PCT Pub. No.: WO2013/107977
PCT Pub. Date: Jul. 25, 2013

(65) Prior Publication Data
US 2014/0377014 A1  Dec. 25, 2014

(30) Foreign Application Priority Data

Jan. 16, 2012  (FR) ..................... 12 50397

(51) Int. Cl.
*E02D 3/12* (2006.01)
*C09K 17/00* (2006.01)
*C09K 17/42* (2006.01)

(52) U.S. Cl.
CPC . *E02D 3/12* (2013.01); *C09K 17/00* (2013.01); *C09K 17/42* (2013.01)

(58) Field of Classification Search
CPC ........... C09K 17/00; C09K 17/42; E02D 3/12
See application file for complete search history.

(56) References Cited

U.S. PATENT DOCUMENTS

| 2,604,382 | A | * | 7/1952 | Woodruff | ........... G01N 27/4167 324/101 |
| 3,959,080 | A | * | 5/1976 | Orth | ................. A61K 47/48176 435/179 |
| 2008/0245272 | A1 | | 10/2008 | Kucharski et al. | |
| 2008/0298901 | A1 | | 12/2008 | Hamelin et al. | |
| 2009/0215144 | A1 | | 8/2009 | Van Paassen et al. | |
| 2010/0086367 | A1 | | 4/2010 | Darson-Baulleur et al. | |
| 2011/0027850 | A1 | * | 2/2011 | Crawford | ................. C12P 3/00 435/168 |
| 2011/0262640 | A1 | * | 10/2011 | Dosier | .................... C04B 24/14 427/215 |
| 2014/0238267 | A1 | * | 8/2014 | Bang | ...................... C09K 17/42 106/162.2 |
| 2014/0363240 | A1 | * | 12/2014 | Putman | .................. C09K 17/12 405/266 |

FOREIGN PATENT DOCUMENTS

| FR | 2644475 | 9/1990 |
| FR | 2873725 | 2/2006 |
| FR | 2911887 | 8/2008 |
| WO | WO 2006/066326 | 6/2006 |
| WO | WO 2007/069884 | 6/2007 |

* cited by examiner

*Primary Examiner* — Benjamin Fiorello
(74) *Attorney, Agent, or Firm* — Hamre, Schumann, Mueller & Larson, P.C.

(57) ABSTRACT

The invention relates to a method for consolidating soil by means of calcifying bacteria, said method comprising washing the consolidated soil and recycling the wash water.

11 Claims, 6 Drawing Sheets

METHOD FOR CONSOLIDATING SOIL

FIELD OF TECHNOLOGY OF THE INVENTION

The invention relates generally to the area of soil consolidation, and more particularly to a method for consolidating soil by means of calcifying bacteria employing a step of recycling the wash water.

PRIOR ART

The bacterial precipitation of calcium carbonates is a well-known natural phenomenon: certain bacteria, when metabolizing a carbon-containing substrate, produce an increase in carbonate and bicarbonate ions in the surroundings which, combined with calcium ions, lead to precipitation of calcium carbonates.

This technique is notably described in patent application FR-A-2 644 475, which relates to a method for protecting an artificial surface by surface coating carried out in situ on said artificial surface by putting the latter in contact with mineralizing microorganisms. Patent application WO 2006/066326 relates to a method intended to produce a high-strength cement in a permeable material by biological means; the method is based on the combined use of a urease producing microorganism, urea and calcium ions, the quantity of the microorganism being such that the rate of hydrolysis of the urea is from 0.5 to 50 mM of urea hydrolyzed/min in standard conditions. Patent application FR-A-2 873 725 relates to a method for consolidating soil according to which a combination of calcifying bacteria and denitrifying bacteria is used.

Moreover, methods for fixation of bacteria on substrates to be calcified are described for example in patent application WO 2007/069884, which relates to a method for immobilizing bacteria in a material that is permeable to said bacteria, based on flocculation of the bacteria by adding a flocculating agent; and in patent application FR-A-2 911 887, which relates to a method of preparing biomass intended to stimulate the production of exopolysaccharides in order to promote fixation of the bacteria on sand.

Fine or liquefiable soils have very low permeability, of the order of $10^{-5}$ m/s. The consolidation or sealing of such soils involves injecting solutions for which the maximum size of the grains that they contain must be under a micron. The advantage of the calcifying bacteria is that they can penetrate deeply into soils via the culture medium containing them, live there so long as nutrients are supplied to them, and cause carbonates to grow on the surface of the soil grains, maintaining open porosity if necessary.

However, the calcifying bacteria produce nitrogenous compounds, which are discharged into the surroundings. Management of these "waste products" is necessary for the method to be ecologically acceptable. This aspect is only considered, as far as the applicant knows, in patent application FR-A-2 873 725, which proposes a solution for treating nitrogenous compounds by means of denitrifying bacteria. This solution is not, however, very satisfactory from a practical standpoint as its application is technically and economically onerous.

Other drawbacks are connected with operational constraints. In fact, the application time can vary considerably from one site to another, or at one and the same site. This requires adapting a particular injection phasing so as to be able to manage site stoppage or waiting times, which can vary from several hours to some days. There is then a risk of the bacteria losing their activity during these waiting times.

More generally, the existing technique does not allow, or does allow but insufficiently, adapting the characteristics of the biomass over the course of the project, depending on the conditions of application (nature of the ground to be treated, length of life of the bacteria, permeability of the soil mass to be treated) to adjust to the length of life of the bacteria.

It is therefore desirable to have at our disposal a method for consolidating soil that is compatible with the site conditions and allows flexible management of the characteristics of the biomass.

It is also desirable that the method in question should respect the environment, allowing simple treatment of the nitrogenous compounds produced by the calcifying bacteria; such a method should also offer economic advantages.

DESCRIPTION OF THE INVENTION

According to a first aspect, the invention relates to a method for consolidating soil by injection of calcifying bacteria which does not require large and expensive installations for preparing the solutions of bacteria that are to be injected.

According to another aspect, the invention relates to a method for consolidating soil by injection of calcifying bacteria comprising washing of the soil, in which the wash water can be reused, notably for preparing the solutions used for the consolidation treatment.

According to another aspect, the invention relates to a method for consolidating soil by injection of calcifying bacteria in which the nitrogenous compounds produced by said bacteria are treated simply and with respect for the environment.

These aims are achieved by the method according to the invention for consolidating soil in situ, which comprises the following steps:

a) injecting a solution of calcifying bacteria, prepared from bacteria in powder form, into the volume of soil to be treated;
b) injecting a calcifying solution;
c) washing the volume of soil treated with water;
d) measuring the ammonium ion concentration in the wash water and in the treated soil;
e) recycling the wash water.

In a first step, the method according to the invention comprises injecting a solution of calcifying bacteria into the volume of soil to be treated.

A calcifying bacterium is advantageously a bacterium allowing an increase in carbonate and bicarbonate ions in the surroundings, notably by metabolizing a carbon-containing substrate, to obtain precipitation of calcium carbonates in the presence of calcium. Advantageously, a bacterium having urease or ureolytic activity is used. A preferred calcifying bacterium is *Sporosarcina pasteurii*.

Figure 1:
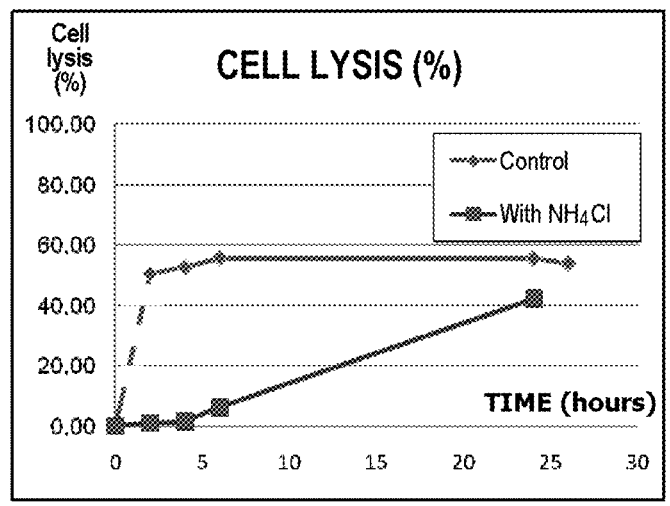
FIG. 1 shows the variation over time of the rate of cell lysis of a bacterial solution used in the context of the invention.

The solution of calcifying bacteria is prepared extemporaneously at the site to be consolidated, by rehydration of bacteria in powder form. Such a powder form may be obtained by a suitable drying step, such as lyophilization, spraying or some other technique, of a liquid biomass prepared industrially beforehand. Use of bacteria in powder form allows preparation at the site as required and also makes it possible to avoid using a bioreactor since it is no longer necessary to culture the bacteria at the site. During rehydration, it is preferable to use water of sufficient ionic strength, favorable to the stability of the bacteria, such as certain types of mains water that are sufficiently mineralized, in order to avoid early lysis in the initial hours following hydration. It is also possible to use a wash water resulting from application of the method of the invention, provided the ammonium ion concentration of this water is under 50 g/l. FIG. 1 shows that rehydration of *Sporosarcina pasteurii* bacteria in powder form in a 10 g/l ammonium chloride solution delays cell lysis significantly in comparison with mains water with low mineralization.

Conventionally, the solution of calcifying bacteria comprises the nutrients necessary to ensure their survival; this solution may also comprise other ingredients as described in patent application FR-A-2 911 887. Thus, the solution of calcifying bacteria may contain an adhesion agent, added during or after culture of the bacteria, before lyophilization, or else added during rehydration of the bacteria in powder form.

As explained in more detail in example 2, it was established that, unexpectedly, there is a linear type of relation between the productivity in $NH_4^+$ during the first four hours of hydration and the initial concentration of the lyophilizate of bacteria, so that it is possible to adjust the desired level of hydrolysis of the urea.

The solution of calcifying bacteria is typically injected into the soil, by gravity or under pressure, by means of feed boreholes. Advantageously, feed is provided by circulation of the solution of calcifying bacteria. This circulation may be provided by means of feed boreholes, pumping or capture boreholes. These techniques advantageously comprise means for monitoring the progress of the treatment for adapting the latter, and are notably described in patent application FR-A-2 873 725.

The solution of calcifying bacteria is injected so as to obtain a certain velocity in the ground, typically between 20 and 100 cm/h. The impregnation of the bacteria is monitored by tracing the optical density (cf. FR-A-2 873 725) and by monitoring the enzymatic activity.

In a second step, the method according to the invention comprises injecting a calcifying solution.

"Calcifying solution" means a solution allowing generation of calcium carbonate, $CaCO_3$, in the presence of calcifying bacteria. Typically, the calcifying solution comprises urea and calcium; the equimolar concentration of this solution is advantageously in the range from 0.1 M to 1.7 M.

The calcifying solution may comprise an adhesion agent as described in patent application FR-A-2 911 887.

The calcifying solution is injected into the ground to be treated at a velocity between 20 and 100 cm/h. The progress of the precipitation of calcite is monitored by measuring the concentration of $NH_4^+$ ions (these ions are produced during hydrolysis of urea: stoichiometry indicates two moles of $NH_4^+$ formed per mole of urea hydrolyzed); depending on the results obtained, it is possible to inject the calcifying solution again to complete the treatment. According to one variant, a calcifying solution with a concentration different from the first is injected. Injection and, if applicable, feed by circulation, of the calcifying solution may be carried out as described above for the solution of calcifying bacteria.

Once calcification of the bacteria is completed, the method according to the invention comprises, in a third step, washing the consolidated soil with water. The problem posed by using the ureolytic route for carbonation is management and removal of the $NH_4^+$ ions formed. It is in fact not generally envisaged for environmental and ecological reasons to leave molar—or supramolar—concentrations in situ. For example, hydrolysis of one mole of urea leads to the formation of an ammonium solution at 36 g/l, whereas the permissible concentration for potable water is 40 µg/l. Extraction of the ammonium solution is certainly possible by pumping. However, return to permissible concentrations in situ requires the use of large volumes of water for performing successive washings (also called "flushes"). Conventionally, this wash water is recovered to be sent to a treatment works. The method according to the invention allows reuse of the water from the successive washings.

For this purpose, the method according to the invention comprises, in a fourth step, measurement of the concentration of $NH_4^+$ ions in the wash water. Once this concentration has been determined, in a fifth step the wash water is reused at the site for carrying out the method according to the invention on other portions of soil to be consolidated. Depending on the concentration of $NH_4^+$ ions in the wash water, the latter may serve:
  either for rehydrating calcifying bacteria in powder form;
  or for preparing calcifying solutions,
  or for washing the soil (and therefore avoiding having to use mains water).

In general, when the measured concentration of $NH_4^+$ ions is greater than or equal to 20 g/l, the wash water is treated so as to obtain a concentration of $NH_4^+$ ions below 1 g/l. The water thus obtained is conveyed to a storage unit and may typically be reused for subsequent washing cycles. Suitable means for carrying out such a treatment comprise for example a concentrating unit, notably a unit for vacuum concentration (evaporation-concentration). In this embodiment, the solid obtained at the end of the concentration step ($NH_4Cl$) will be able to be utilized for example as fertilizer, or for preparing urea. Any other concentrating means, for example the techniques of crystallization or precipitation, may be used in the context of the invention.

However, depending on the progress of work at the site where the method is used, it is possible to use a wash water having a concentration of $NH_4^+$ ions in the range from about 5 g/l to about 50 g/l, preferably in the range from about 20 g/l to about 50 g/l, more preferably in the range from about 20 g/l to about 30 g/l for rehydrating calcifying bacteria in powder form.

When the concentration of $NH_4^+$ ions is below 20 g/l, the wash water is conveyed directly to a water storage unit, to be used as follows:
  if the concentration of $NH_4^+$ ions is between 1 and <20 g/l, the wash water may be used for preparing the solution of calcifying bacteria or for preparing calcifying solutions;
  if the concentration of $NH_4^+$ ions is below 1 g/l, the wash water may be used for other washing cycles.

Advantageously, the soil washing step is repeated until a wash water is obtained whose concentration of $NH_4^+$ ions is below 0.1 g/l. In this instance, the wash water may be discharged directly into the environment (for example, watercourses or sewers) or sent to a treatment works, depending on the regulatory constraints of the country in which the site is located.

In one embodiment of the invention, the soil to be consolidated is divided into parcels or plots, preferably into parcels or plots of roughly equal volume. In this embodiment, the wash water obtained after treatment of the first plot is reused for preparing some or all of the solutions necessary for treating and/or washing the remaining plot or plots, according to the instructions given above.

It is thus possible to recover the wash water by creating a circulating loop, giving a significant reduction in the total amount of water used. Thus, in the example given below, about 60% of the volume of water used could be recycled. This is very advantageous from an environmental and economic standpoint: the cost of water supply is reduced; the volume of water to be stored and/or treated prior to discharge is reduced; the water from the last wash contains a (very) small amount of ammonium ions and can be treated at lower cost.

The invention is illustrated by the following examples, given purely for purposes of illustration. In these examples, the following expressions and abbreviations are used:
EA: enzymatic activity
$EA_{tot}$: total enzymatic activity
Biomass: solution containing the calcifying bacteria
OD: optical density
Flush: washing
Calcifying solutions 1 and 2: equimolar solutions (1.1 M) of urea and of calcium Batch time: resting time, during which injection is stopped to allow the reaction to develop
Pore volume (PV): volume of the voids of a porous medium of volume V

EXAMPLE 1

Cell Lysis as a Function of Time

When bacteria are submitted to lyophilization, their structure and/or their physiology are sometimes disturbed considerably. When they are rehydrated in water from the urban mains, this is reflected in the more or less rapid appearance of cell lysis and/or a decrease in their intracellular enzymatic activity.

The effect of adding ammonium chloride during rehydration of lyophilized *Sporosarcina pasteurii* bacteria was tested according to the following protocol.

78 mg of powdered lyophilizate were added to 100 ml of urban mains water containing 10 g/l of $NH_4Cl$. The lyophilizate was left to rehydrate at room temperature for 5 min with stirring. The variation in the proportion of cells lysed as a function of time was monitored by measuring the optical density at 600 nm ($OD_{600}$), fixing $T_0$ after 5 min of rehydration. $OD_{600}$ was read during the first 6 hours and then at 24 h and at 26 h.

For comparison ("control"), the same experiment was carried out with urban mains water not containing $NH_4Cl$.

$OD_{600}$ only quantifies the intact cells. Although the concentration of lyophilizate is always the same, the $OD_{600}$ values at $T_0$ are slightly different. The variations over time are therefore difficult to compare. That is why the results are made uniform by expressing them as a percentage of cells lysed.

FIG. 1 shows the evolution of the proportion of cells lysed as a function of time. Interpretation of the curves demonstrates a common profile, which can be divided into two parts:
 the first corresponds to more or less rapid lysis of the cells,
 the second corresponds to the appearance of a state of equilibrium.

Thus, when the lyophilizate is rehydrated in water from the urban mains, in 6 hours of contact 67% of the cells are lysed. Only about 15% of intact cells remain, which are maintained until 24 or 26 h. Addition of 10 g/l of $NH_4Cl$ protects the cellular structures, since it is found that there is absence of lysis after 4 h, with 60% of cells not lysed at 24 h.

EXAMPLE 2

Correlation Between Productivity of Ammoniacal Nitrogen of the Lyophilizate and Concentration of Biomass Measurement of Enzymatic Activity 0.3 g of powdered lyophilizate of *Sporosarcina pasteurii* was suspended in 16 ml of water, to form a first bottle identified as "pure" with a concentration of 18.75 g/l. This starting dose was calculated so as to have an enzymatic activity of about 8000 S/min. Then dilutions by ½ were carried out until the dilution was 1/128.

27 ml of urea at 1.1M and 3 ml of sample from each dilution were put in a 50-ml beaker (each sample was therefore diluted 10-fold in the urea). The temperature was maintained at 20° C. The conductivity was monitored every minute, for 6 minutes. The EA corresponds to the slope of the straight line representing conductivity as a function of time and is expressed in μS/min, which is multiplied by 10 (dilution factor). The results are presented in Table 1.

TABLE 1

| Dilution | Pure | 1/2 | 1/4 | 1/8 | 1/16 | 1/32 | 1/64 | 1/128 |
|---|---|---|---|---|---|---|---|---|
| [lyophilizate] (g/l) | 18.750 | 9.375 | 4.688 | 2.344 | 1.172 | 0.586 | 0.293 | 0.146 |
| $EA_{tot}$ (μS/min) | 14069 | 7095.7 | 4277.1 | 2479 | 1188.1 | 545.4 | 113 | 46.7 |

Figure 2:
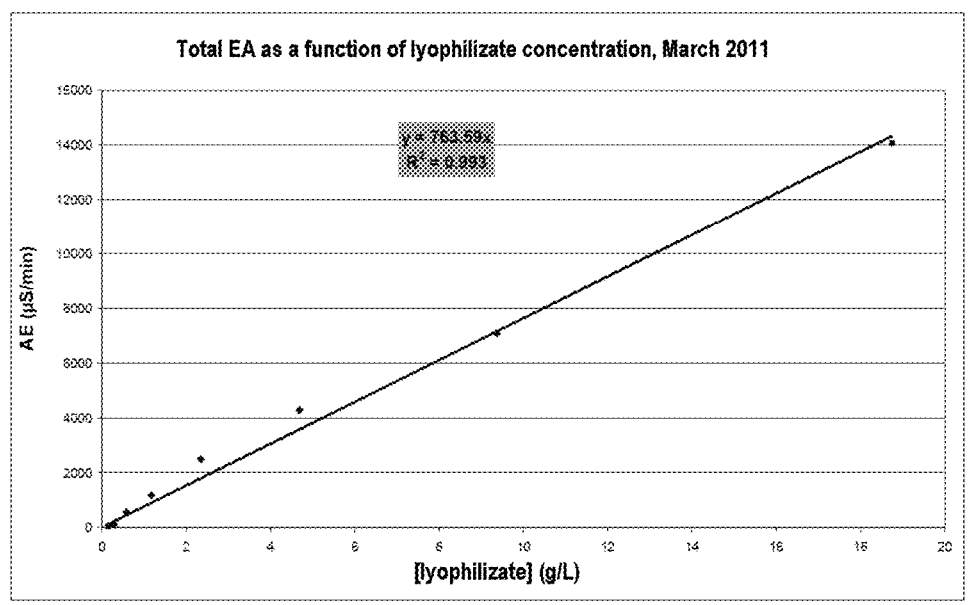
FIG. 2 shows the relation between total enzymatic activity (EA) and concentration of lyophilizate.

FIG. 2 shows that the relation between total EA and concentration of lyophilizate is a linear type of relation with the following equation:

$$EA_{tot}(\mu S/min) = 763.59 \times [lyophilizate](g/l); R^2 = 0.993$$

Measurement of Productivity in $NH_4^+$ Over 4 Hours

The variation over time of the concentration of $NH_4^+$ was determined for each dilution of lyophilizate. Samples were taken at $T_0$, $T_0+1$ h, $T_0+2$ h, $T_0+3$ h and $T_0+4$ h and were diluted in suitable proportions. Then 2 ml from these dilutions and 0.1 ml of Nessler reagent were put in a suitable spectrometry cell. The OD at 425 nm was measured after 1 minute. The concentration of $NH_4^+$ is calculated from the equation that relates the OD to the $NH_4^+$ concentration of the sample, subtracting the OD of a control with water from the OD reading. For the apparatus used in the experiments, the formula is as follows:

$$[NH_4^+](mM) = (OD_{425} \times dilution)/2.337.$$

The set of results is presented in Table 2 below.

TABLE 2

| Dilution | Pure | 1/2 | 1/4 | 1/8 | 1/16 | 1/32 | 1/64 | 1/128 |
|---|---|---|---|---|---|---|---|---|
| [Lyophilizate](g/L) | 18.75 | 9.38 | 4.69 | 2.34 | 1.17 | 0.59 | 0.29 | 0.15 |
| Total EA (µS/min) | 14069 | 7095.7 | 4277.1 | 2479 | 1188.1 | 545.4 | 113 | 46.7 |
| Productivity (mmol/l/h) | / | 5625.4 | 3929.5 | 2439.5 | 1218.4 | 602.45 | 244.62 | 56.265 |
| Rate of hydrolysis (mmol urea/l/min) | / | 46.88 | 32.75 | 20.33 | 10.15 | 5.02 | 2.04 | 0.47 |

Figure 3A:
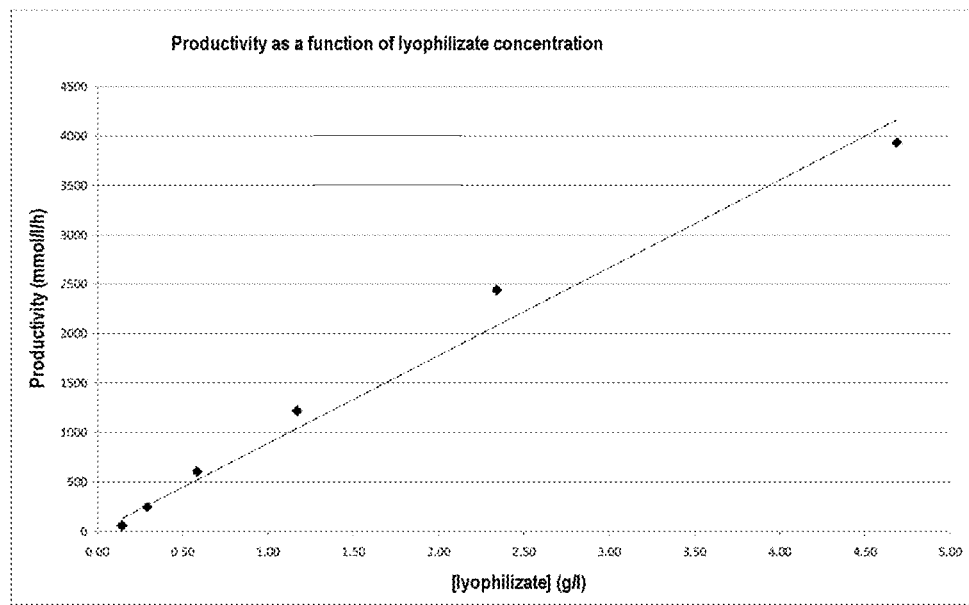
FIG. 3A shows the productivity in $NH_4^+$ as a function of the concentration of lyophilizate.
Figure 3B:
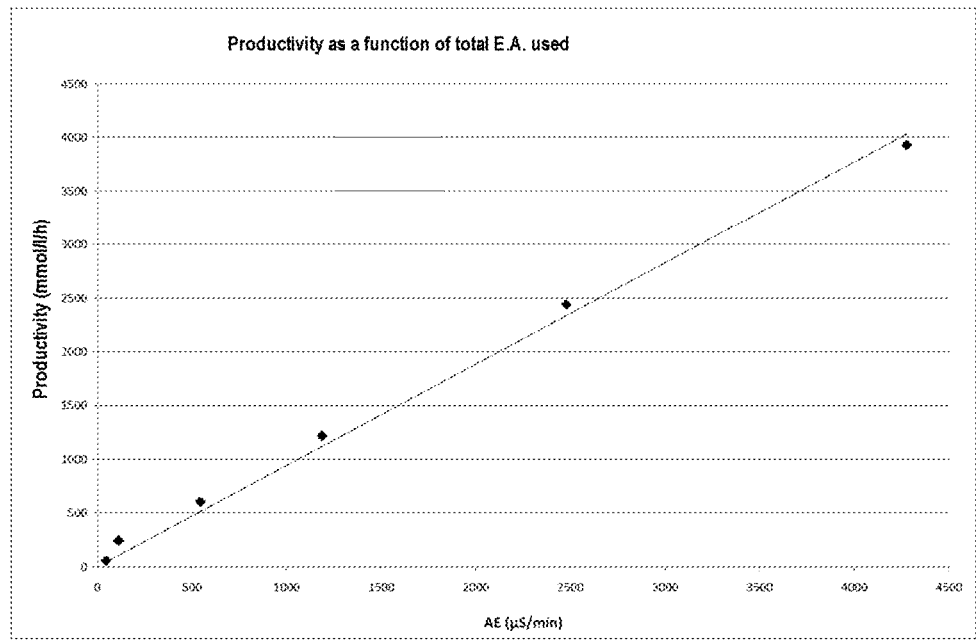
FIG. 3B shows the productivity in $NH_4^+$ as a function of the total EA.

The productivities measured during the first four hours are proportional to the concentrations of lyophilizate used and to the initial enzymatic activities, as indicated in FIGS. 3A and 3B.

These two graphs illustrate the flexibility offered by using the bacteria in the form of powder on site, and selecting the biomass dilution as a function of the productivity required. In fact, starting from this productivity, it is possible to determine the corresponding enzymatic activity and the concentration of bacteria to use in the biomass. Monitoring the enzymatic activity is a simple measurement to be carried out on site, since it takes 6 minutes.

Figure 3C:
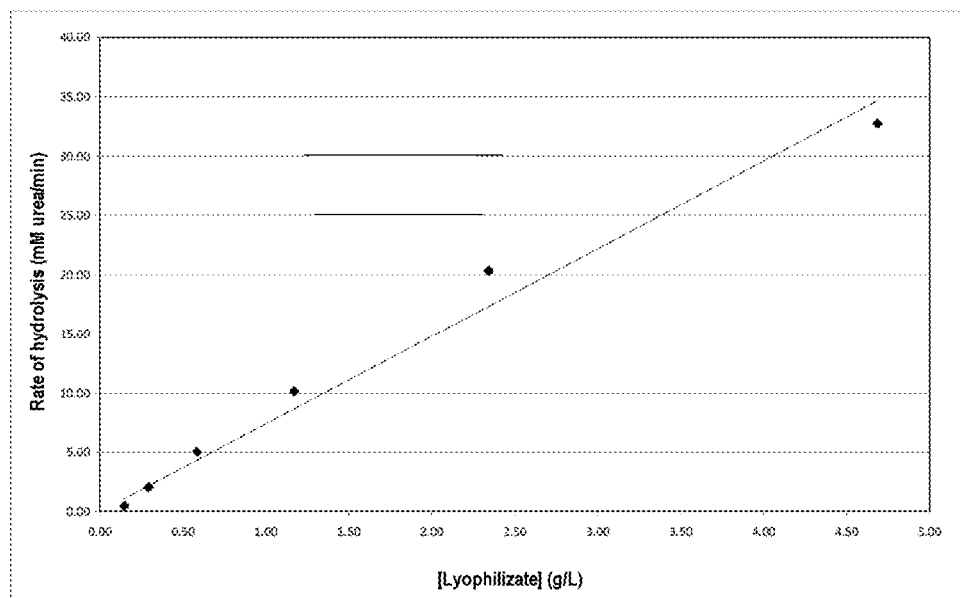
FIG. 3C shows the rate of hydrolysis as a function of the concentration of lyophilizate.

Based on the measurement of productivity, it is also possible to find the rates of hydrolysis of the urea over the first four hours, as shown in FIG. 3C. It can be seen that in the usual range of use of lyophilizate, up to about 5 g/l, the rates of hydrolysis measured over 4 h reach values of the order of 35 mM urea/min.

Using the relation given in patent application WO 2006/066326 (urea hydrolyzed (mM)=11.11×conductivity (mS)), we obtain a rate of hydrolysis of the order of 100 mM/min for a value of $EA_{tot}$ of 4277 µS/min (cf. Table 2, dilution 1/4). It is interesting to compare this value with the maximum value given in WO 2006/066326 of 50 mM of urea/min.

EXAMPLE 3

Treatment of Soil

The method according to the invention was carried out on a 6 m×12 m plot of ground. The soils present consist of modern alluvial deposits from the Rhone on a layer of more compact ancient alluvial deposits (cf. FIG. 5). The modern alluvial deposits are loose sands, more or less silty, very susceptible to liquefaction in the case of seismic activity.

The objective of the treatment is to improve the cohesion of the loose sands in order to reduce the risk of liquefaction in case of seismic activity. The strength required (protection against liquefaction) is of the order of 0.2 MPa to 0.25 MPa. "Liquefaction of sands" means any process leading to total loss of shear strength of the soil through increase in the interstitial pressure (according to standard NF P 06-013).

Figure 5:
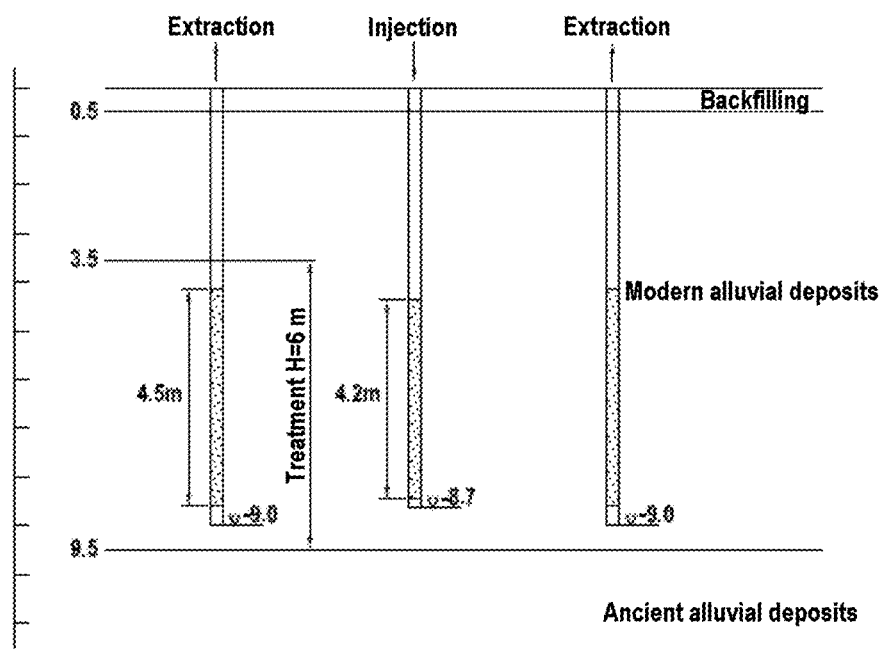
FIG. 5 shows a sectional view of an application of the method of the invention.

The boreholes were spaced, with a 3 m×3 m grid, by dividing the zone into 4 plots A, B, C, D, each of 6 m×3 m; FIG. 5 shows a sectional view of one of these plots.

The zone of liquefiable loose sand was detected by the "Cone Penetration Test" (CPT). The risk of liquefaction is low in the zone away from the water table, therefore the saturated layer of liquefiable sand, from 3.50 m to 9.5 m, or 6 m thick, was treated. The volume of soil to be treated per plot is therefore: 3×6×6=108 m³, which corresponds to a pore volume (PV) of about 44 m³ for a porosity of 40% (PV=108× 0.4).

Classical hydraulic calculations aided by suitable software make it possible to optimize the grid of boreholes (for injection, pumping and washing), as well as the treatment parameters, such as flow rates for injection and pumping, batch times, etc.

Figure 4:
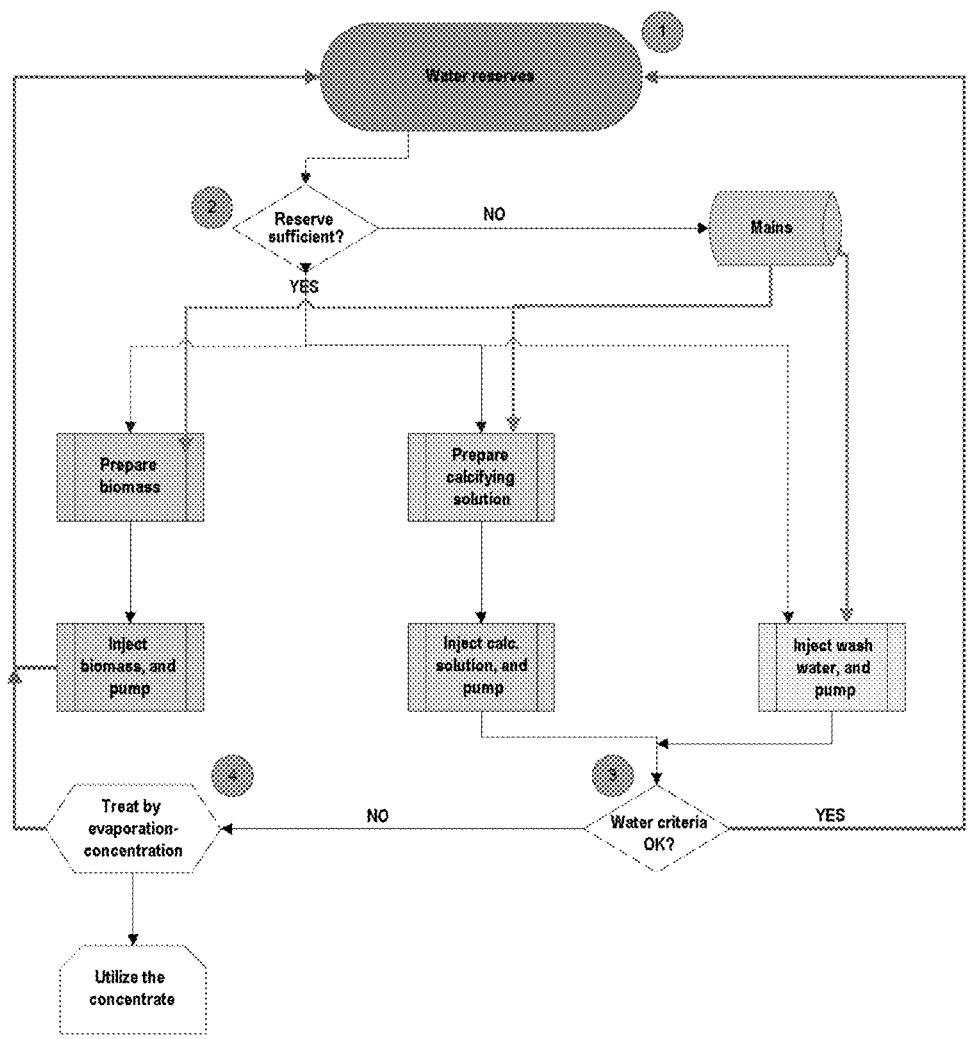
FIG. 4 shows a general flow sheet for implementing the method of the invention.
Figure 6:
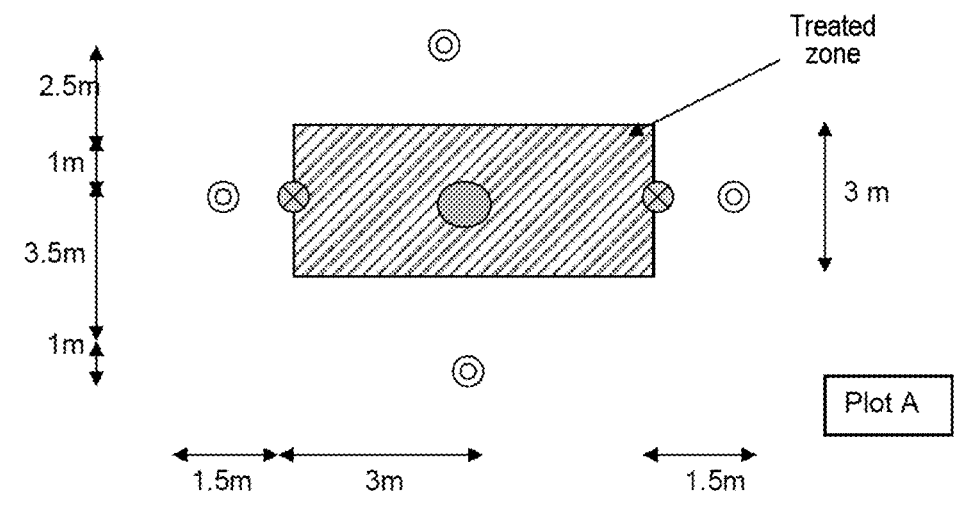
FIGS. 6 and 7 show a top view of FIG. 5.
Figure 7:
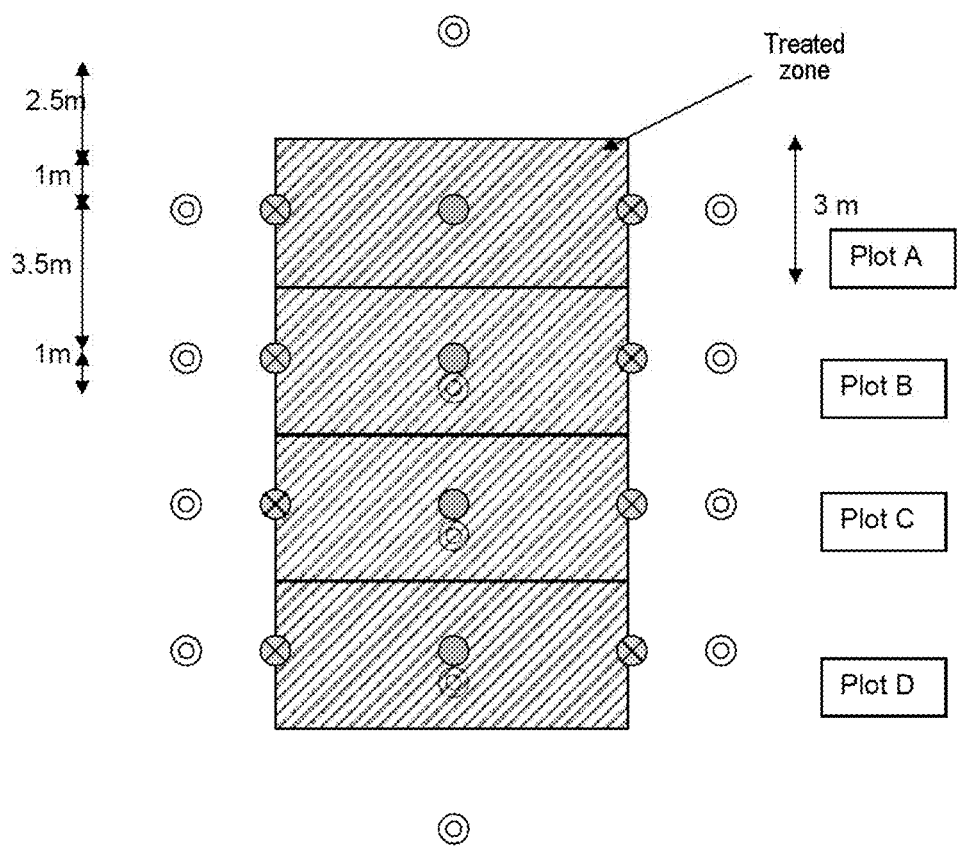

The different steps of the method are shown schematically in FIG. 4 and in more detail in FIGS. 6 and 7; in the latter, the following symbols are used:

◉ Injection wells of the biomass and calcifying solutions, and wells for extraction of the calcifying solutions during washing
⊗ Wells for extraction during the injections
◎ Lined washing wells in the treated layer Preparation of the Solutions Depending on the constraints on application of the site, a rate of hydrolysis of 5.8 mmol urea/l/min is set, giving an $EA_{tot}$ of 600 µS/min.

To reach these values it is necessary to use a concentration of lyophilized bacteria of 0.78 g/l.

Plot A—Injection of the Solutions—FIG. 6

The solutions were injected according to the following protocol. The injection flow rate was 5.5 m³/h.

$T_0$ to $T_0+7.5$ h=$T_1$ Injection of 1 PV (6×3×6×0.4)=44 m³ of bacteria
$T_1$ to $T_1+7$ h=$T_2$ Batch time
$T_2$ to $T_2+7.5$ h=$T_3$ Injection of calcifying solution No. 1 (1 PV)
$T_3$ to $T_3+24$ h=$T_4$ Batch time
$T_4$ to $T_4+7.5$ h=$T_5$ Injection of calcifying solution No. 2 (1 PV)
$T_5$ to $T_5+35$ h=$T_6$ Batch time First the solution of calcifying bacteria is injected, which will displace the water contained in the soil; the bacteria are left to become fixed in the soil (batch time). Then calcifying solution No. 1 is injected, which will displace the solution of bacteria; a biomass residue is collected. Calcification is allowed to take place (batch time), then a second calcifying solution is injected, which will displace the first calcifying solution (this step is optional, and can be omitted if the required mechanical strength is reached); a residue of the first calcifying solution is collected, and calcification is left to go to completion (batch time).

Plot A—Washing—FIG. 6

Washing with water is carried out at a flow rate of 3.5 m³/h. As many washings are carried out as required to obtain a wash water with a concentration of $NH_4^+$ ions below 100 mg/L.

Plots B-C-D—FIG. 7

Plots B, C and D are treated in the same way as plot A.

Results

Table 3 summarizes the different steps of the method according to the invention, applied to plot A, and includes the concentration of $NH_4^+$ ions measured once calcification of the soil takes place. The values measured for plot A were extrapolated to plots B, C and D; the results are presented in Tables 4 to 6.

As can be seen on reading Table 3, the soil water displaced by injection of the biomass is used for preparing the first calcifying solution, and the biomass water displaced by injection of the first calcifying solution is used for preparing the second calcifying solution.

The consolidated soil in plot A is washed seven times using mains water. The water collected is recycled for treating plot B (wash waters A5-A10) and plot D (wash waters A3-A4).

The wash water from plot B is recycled for treating plot C (waters B5-B10) and plot D (waters B3-B4).

The wash water from plot C is recycled for treating plot D (waters C5-C9).

TABLE 3

Plot A

| Water used | Product injected | Product extracted | [NH$_4^+$] (g/l) | PV (m$^3$) | Destination of product extracted | | REF. |
|---|---|---|---|---|---|---|---|
| mains | Biomass | Ground water | — | 44 | recycling | cal sol 1A | A1 |
| A1 | Cal sol 1A | Biomass water | — | 44 | recycling | cal sol 2A | A2 |
| A2 | Cal sol 2A | NH$_4$Cl | 35.51 | 44 | evaporation | flush 6D | A3 |
| mains | Flush 1 | NH$_4$Cl | 41.79 | 44 | evaporation | flush 7D | A4 |
| mains | Flush 2 | NH$_4$Cl | 16.46 | 44 | recycling | biomass B | A5 |
| mains | Flush 3 | NH$_4$Cl | 4.82 | 44 | recycling | biomass B/cal sol 1B | A6 |
| mains | Flush 4 | NH$_4$Cl | 1.53 | 44 | recycling | cal sol 1B + 2B | A7 |
| mains | Flush 5 | NH$_4$Cl | 0.53 | 44 | recycling | flush 1B | A8 |
| mains | Flush 6 | NH$_4$Cl | 0.21 | 44 | recycling | flush 2B | A9 |
| mains | Flush 7 | NH$_4$Cl | 0.09 | 44 | recycling | flush 3B | A10 |

TABLE 4

Plot B

| Water used | Product injected | Product extracted | [NH$_4^+$] (g/l) | PV (m$^3$) | Destination of product extracted | | REF |
|---|---|---|---|---|---|---|---|
| A5 | Biomass | Ground water | — | 44 | recycling | cal sol 1B | B1 |
| A6 | Cal sol 1B | Water biomass | — | 44 | recycling | cal sol 2B | B2 |
| A7 | Cal sol 2B | NH$_4$Cl | 35.51 | 44 | evaporation | flush 3D | B3 |
| A8 | Flush 1 | NH$_4$Cl | 41.79 | 44 | evaporation | flush 4D | B4 |
| A9 | Flush 2 | NH$_4$Cl | 16.46 | 44 | recycling | biomass C | B5 |
| A10 | Flush 3 | NH$_4$Cl | 4.82 | 44 | recycling | biomass C/cal sol 1C | B6 |
| mains | Flush 4 | NH$_4$Cl | 1.53 | 44 | recycling | cal sol 1C + 2C | B7 |
| mains | Flush 5 | NH$_4$Cl | 0.53 | 44 | recycling | flush 1C | B8 |
| mains | Flush 6 | NH$_4$Cl | 0.21 | 44 | recycling | flush 2C | B9 |
| mains | Flush 7 | NH$_4$Cl | 0.09 | 44 | recycling | flush 3C | B10 |

TABLE 5

Plot C

| Water used | Product injected | Product extracted | [NH$_4^+$] (g/l) | PV (m$^3$) | Destination of product extracted | | REF |
|---|---|---|---|---|---|---|---|
| B5 | Biomass | Ground water | — | 44 | recycling | cal sol 1c | C1 |
| B6 | Cal sol 1 | Biomass water | — | 44 | recycling | cal sol 2c | C2 |
| B7 | Cal sol 2 | NH$_4$Cl | 35.51 | 44 | evaporation | clean water | C3 |
| B8 | Flush 1 | NH$_4$Cl | 41.79 | 44 | evaporation | clean water | C4 |
| B9 | Flush 2 | NH$_4$Cl | 16.46 | 44 | recycling | biomass D | C5 |
| B10 | Flush 3 | NH$_4$Cl | 4.82 | 44 | recycling | biomass D/cal sol 1D | C6 |
| mains | Flush 4 | NH$_4$Cl | 1.53 | 44 | recycling | cal sol 1 + 2D | C7 |
| mains | Flush 5 | NH$_4$Cl | 0.53 | 44 | recycling | flush 1D | C8 |
| mains | Flush 6 | NH$_4$Cl | 0.21 | 44 | recycling | flush 2D | C9 |
| mains | Flush 7 | NH$_4$Cl | 0.09 | 44 | recycling | flush 5D | C10 |

TABLE 6

| | | | Plot D | | | |
|---|---|---|---|---|---|---|
| | Product injected | Product extracted | [NH$_4^+$] (g/l) | PV (m$^3$) | Destination of product extracted | |
| C5 | Biomass | Ground water | — | 44 | removal | environment |
| C6 | Cal sol 1D | Biomass water | — | 44 | removal | environment |
| C7 | Cal sol 2D | NH$_4$Cl | 35.51 | 44 | evaporation | environment |
| C8 | Flush 1 | NH$_4$Cl | 41.79 | 44 | evaporation | environment |
| C9 | Flush 2 | NH$_4$Cl | 16.46 | 44 | evaporation | environment |
| B3 | Flush 3 | NH$_4$Cl | 4.82 | 44 | evaporation | environment |
| B4 | Flush 4 | NH$_4$Cl | 1.53 | 44 | removal | environment |
| C10 | Flush 5 | NH$_4$Cl | 0.53 | 44 | removal | |
| A3 | Flush 6 | NH$_4$Cl | 0.21 | 44 | removal | environment |
| A4 | Flush 7 | NH$_4$Cl | 0.09 | 44 | removal | environment |

A synopsis of the various products injected for treating plots A to D is given in Table 7.

TABLE 7

| Origin | | Volumes in m$^3$ | % total | % of the recycled portion |
|---|---|---|---|---|
| Mains[1] | 16*44 | 704 | 40% | |
| Cal sol[2] | 8*44 | 352 | 20% | 33.33% |
| Biomass[3] | 3*44 | 132 | 7.5% | 12.5% |
| Flush[4] | 13*44 | 572 | 32.5% | 54.17% |
| total | | 1760 | 100% | |
| Recycled (2 + 3 + 4) | | 1056 | 60% | |

[1] mains water used for treating plots A, B and C
[2] calcifying solutions, prepared from recycled water, used for treating plots A, B, C and D
[3] biomass, prepared from recycled water, used for treating plots B, C and D
[4] recycled wash water, used for treating plots B, C and D It can be seen that in the method according to the invention, 60% of the water used either for preparing the biomass, or for preparing the calcifying solutions, or for washing the consolidated soil, is recycled water. This proves particularly advantageous at sites where it is difficult to supply water. This also facilitates site management (storage, transport, treatment).

The invention claimed is:

1. A method for consolidating soil in situ comprising the following steps:
   a) injecting a solution of calcifying bacteria, prepared from bacteria in powder form, into the volume of soil to be treated;
   b) injecting a calcifying solution;
   c) washing the volume of soil treated with water;
   d) measuring the ammonium ion concentration in the wash water and in the treated soil;
   e) recycling the wash water to the process.

2. The method as claimed in claim 1, which further comprises monitoring the progress of calcification of the bacteria and, if necessary, repetition of step b) with an identical or different calcifying solution.

3. The method as claimed in claim 2, wherein step b) is repeated using the same calcifying solution.

4. The method as claimed in claim 1, wherein the ammonium ion concentration measured in step d) is greater than or equal to 20 g/l, and step e) comprises:
   e1) treating the wash water to obtain water whose ammonium ion concentration is below 1 g/l; and
   e2) conveying the water thus obtained to a water storage unit.

5. The method as claimed in claim 1, wherein the ammonium ion concentration measured in step d) is below 20 g/l, and step e) comprises: conveying the wash water to a water storage unit.

6. The method as claimed in claim 1, wherein step c) is repeated until an ammonium ion concentration in the wash water below 100 mg/l is obtained.

7. A method for in situ consolidation of several plots of soil that comprises carrying out the method defined in claim 1 for each of said plots.

8. The method as claimed in claim 7, wherein the wash water from one of the plots, whose ammonium ion concentration is in the range from 5 to 50 g/l, is used for preparing the solution of calcifying bacteria required for treating one or more other plots.

9. The method as claimed in claim 8, wherein the wash water from one of the plots, whose ammonium ion concentration is in the range from 20 g/l to 30 g/l, is used for preparing the solution of calcifying bacteria required for treating one or more other plots.

10. The method as claimed in claim 7, wherein the wash water from one of the plots, whose ammonium ion concentration is in the range from 1 g/l to <20 g/l, is used for preparing the solution of calcifying bacteria and/or the calcifying solution(s) required for treating one or more other plots.

11. The method as claimed in claim 7, wherein the wash water from one of the plots, whose ammonium ion concentration is below 1 g/l, is used for washing one or more other plots.

* * * * *